INVENTOR:
JAN S. STASIEK
ATTORNEYS

INVENTOR
JAN S. STASIEK

ATTORNEYS

July 8, 1969  J. S. STASIEK  3,453,860
TORQUE METER

Filed April 25, 1966  Sheet 4 of 5

INVENTOR:
JAN S. STASIEK

ATTORNEYS

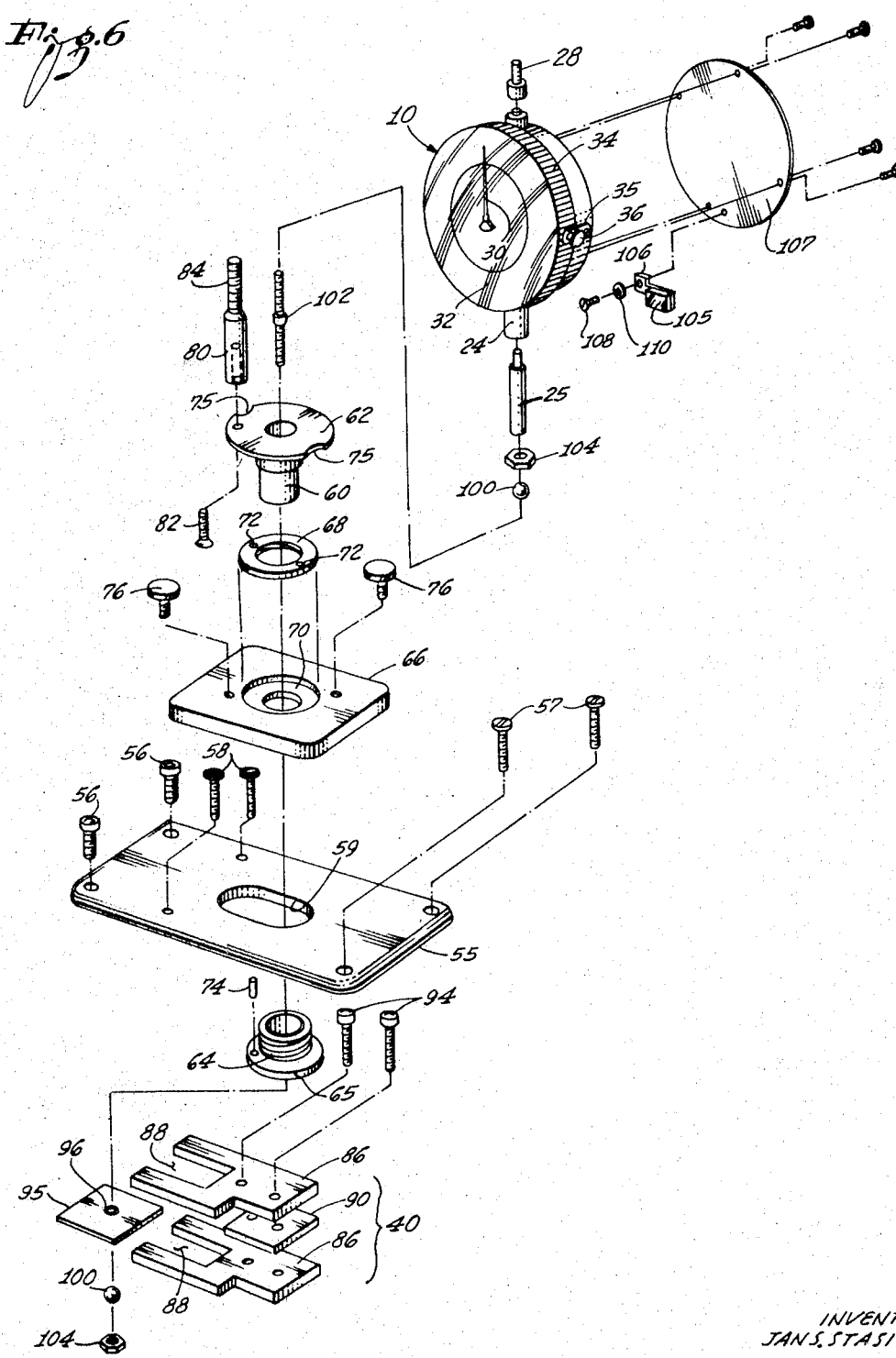

United States Patent Office 3,453,860
Patented July 8, 1969

3,453,860
TORQUE METER
Jan S. Stasiek, Altadena, Calif., assignor to Torque Controls, Inc., El Monte, Calif., a corporation of California
Filed Apr. 25, 1966, Ser. No. 544,945
Int. Cl. G01l 25/00
U.S. Cl. 73—1                               23 Claims

ABSTRACT OF THE DISCLOSURE

An apparatus for calibrating torque wrenches and other torque tools. A torque absorbing bar is anchored at one end and provided with means at the other end for receiving the torque wrench. A gage is provided to indicate the amount of twisting of the bar, and the amount of torque applied to the torque bar. Means are provided to protect the gage from sudden release of the torque and to minimise backlash.

---

This invention relates to a torque measuring device and, more particularly, refers to a torque meter that may be used, for example, to calibrate such devices as torque wrenches and torque screw drivers which release automatically when an applied torque reaches a predetermined magnitude.

The primary problem to which the invention is directed is to provide a torque meter of simple and rugged construction that may be produced in quantity at relatively low cost and may be depended upon for accurate operation with freedom from trouble over a long service life. More specific problems that are met by the invention include: the problem of protecting the indicating mechanism of the torque meter from the reaction to abrupt termination or release of an applied torque; the problem of eliminating errors arising from backlash; the problem of constructing a torque meter capable of measuring torque forces in opposite directions with equal facility; the problem of providing for easy reading of the test values from any desired direction for the convenience of the operator; the problem of constructing a torque meter that may be easily and quickly calibrated whenever desired; and the problem of providing a torque meter that may be readily changed from measuring torque values in one range to measuring torque values in a different range.

The invention employs a torque bar which is fixedly anchored at one end and is adapted for the application of torque forces thereto at the other end. A further specific problem to which the invention is directed is to measure with high accuracy the degree to which the torque bar twists in response to an applied torque. Another specific problem is to simplify the task of calibrating such a torque meter with respect to the torsional response of a particular torque bar.

In the usual torque meter of this type which employs a torque bar, the torsional response of the torque bar is transmitted to an indicating pointer by means of a gear segment on the bar in cooperation with a pinion on the shaft of the pointer. One disadvantage of such an arrangement is the inevitable presence of backlash between the gear segment and the pinion. Another serious disadvantage resides in the difficulties involved in correlating the indicating mechanism with a particular torque bar. Considerable care is required in the fabrication of a torque bar to match a particular indicating mechanism and too often it is necessary to discard a torque bar that does not match.

The invention avoids these difficulties of backlash and mismatch by a number of concepts which work together for the purpose of the invention. The first of the concepts is to take advantage of the fact that over a relatively short arc, linear measurements taken along a chord of the arc are closely proportional to the corresponding measurements along the arc itself. It has been found that acceptable accuracy for many purposes may be achieved if the range of torque values to be measured along the chord extends over an angle no greater than approximately 10° and it is a striking fact that if the overall range is limited to an angle of approximately 5°, the measurements along the chord as distinguished from measurements along the arc are accurate to four figures. Accuracy to only three figures suffices for highly precise torque measurements. To carry out this first concept, the torque bar is provided with a lateral arm that swings through a short arc in response to the contemplated maximum torsional stressing of the bar.

The second concept is to use an indicator gage or dial indicator for torque measurements with an axially movable sensing member of the gage positioned in the path of swinging movement of the lateral arm of the torque bar and aligned to move along a chord of an arcuate path described by a point on the arm. A special advantage of this arrangement is that the length of the chord that corresponds to a given magnitude of rotation of the arm varies with the distance of the chord from the axis of rotation of the arm, i.e. from the axis of the torque bar, and therefore the scale of a particular dial indicator may be correlated with the torsional response of a particular torque bar by simply moving the dial indicator bodily to shift the sensing member along the arm towards or away from the axis of the torque bar. With this simple calibration procedure available, torsion bars may be mass produced with liberal tolerances and without the necessity of discarding any of the torsion bars.

Another advantage of the described combination of a dial indicator and a lateral arm on the torque bar is that the torsion bar may be removable so that one torque bar may be substituted for another when it is desired to shift from one range of torque measurements for another.

A feature of the preferred embodiment of the invention is the further concept of providing a floating operation connection between the sensing member of the dial indicator and the lateral arm of the torque bar, i.e. a connection that is freely movable along the length of the lateral arm. By virtue of this arrangement the shifting of the dial indicator towards and away from the axis of the torque bar for the purpose of calibration causes corresponding shifting of the chord that is measured by the dial indicator. For this purpose the sensing member of the dial indicator extends through an aperture in a small plate that is held captive by the lateral arm with freedom for the plate to shift longitudinally of the arm.

In the preferred practice of the invention, the sensing member of the dial indicator is operatively associated with the lateral arm of the torque bar in such manner as to permit measurement of the torque forces in opposite rotary directions. For this purpose the sensing member of the dial indicator that extends through the aperture in the lateral arm is provided with two spaced shoulders or enlargement for selective abutment against the arms. Thus torque forces in one direction are measured by the lateral arm of the torque bar pushing against one enlargement of the sensing member to move the sensing member of the dial indicator in one direction and measurement of torque forces in the opposite rotary direction is accomplished by the lateral arm pushing against the other enlargement of the sensing member to move the sensing member in the opposite longitudinal direction.

A feature of the described arrangement of two spaced shoulders or enlargements on the sensing member for selective cooperation with the lateral arm is that the two shoulders or enlargements may be spaced apart sufficiently to prevent damage to the indicating mechanism by the reaction of the torque bar to abrupt release from a torque force. For this purpose, care is taken to space the two shoulders or enlargements apart by a distance that is greater than the range of reverse swing of the lateral arm that results from abrupt release of the arm from a maximum applied torque force.

The features and advantages of the invention may be understood from the following detailed description and the accompanying drawings.

In the drawings which are to be regarded as merely illustrative:

FIG. 6 is an exploded view of parts of the indicating mechanism and parts of the lateral arm of the torque bar.

Figure 1:
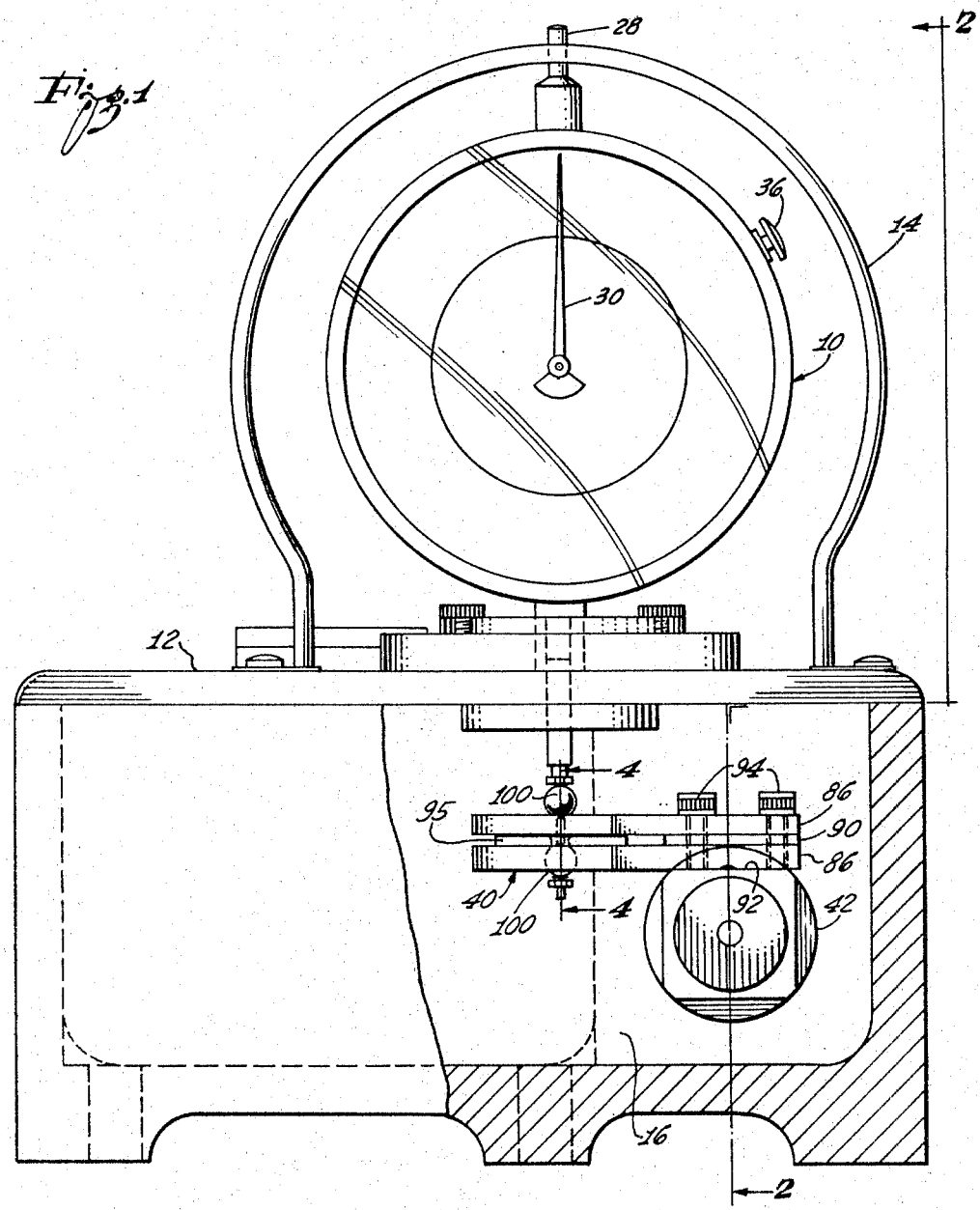
FIG. 1 is an end elevation of the presently preferred embodiment of the invention with portions broken away to reveal concealed structure.

In the drawings illustrating the presently preferred embodiment of the invention a gage 10 of the micrometer-indicator type is mounted on a housing 12, and is enclosed by a guard 14 made of metal rods. The housing 12 is in the form of a hollow casting which is formed with a longitudinal passage 15 (FIG. 2), a well 16 near the forward end of the passage and a storage compartment 18 (FIG. 3) that is normally closed by a slidable cover 20 having a handle 22. The storage compartment 18 may be used for papers and tools and may be used to store the gage 10 when the torque meter is not in use.

The indicating gage 10 is of a well known type that need not be described in detail. The gage has a lower tubular extension 24 in which is slidably mounted a sensing member 25 which is made in sections. The gage is further provided with an upper plunger 28 which may be shifted longitudinally to cause corresponding shift of the sensing member 25. In the usual member, the sensing member 25 and the plunger 28 are connected to a pointer 30 by concealed mechanism. The position of the pointer 30 is read with reference to a dial 32 which is rotatably mounted on the gage body by a cylindrical flange 34, the flange 34 being knurled as shown to facilitate manual rotation. The dial 32 may be releasably anchored at any rotary position at which it may be set and for this purpose a small bracket 35 overhanging the flange 34 is provided with a radial thumb screw 36 which may be tightened against the flange. The dial 32 is marked with a circumferential scale (not shown) which has two sets of numbers for measurement in opposite circumferential directions.

Figure 2:
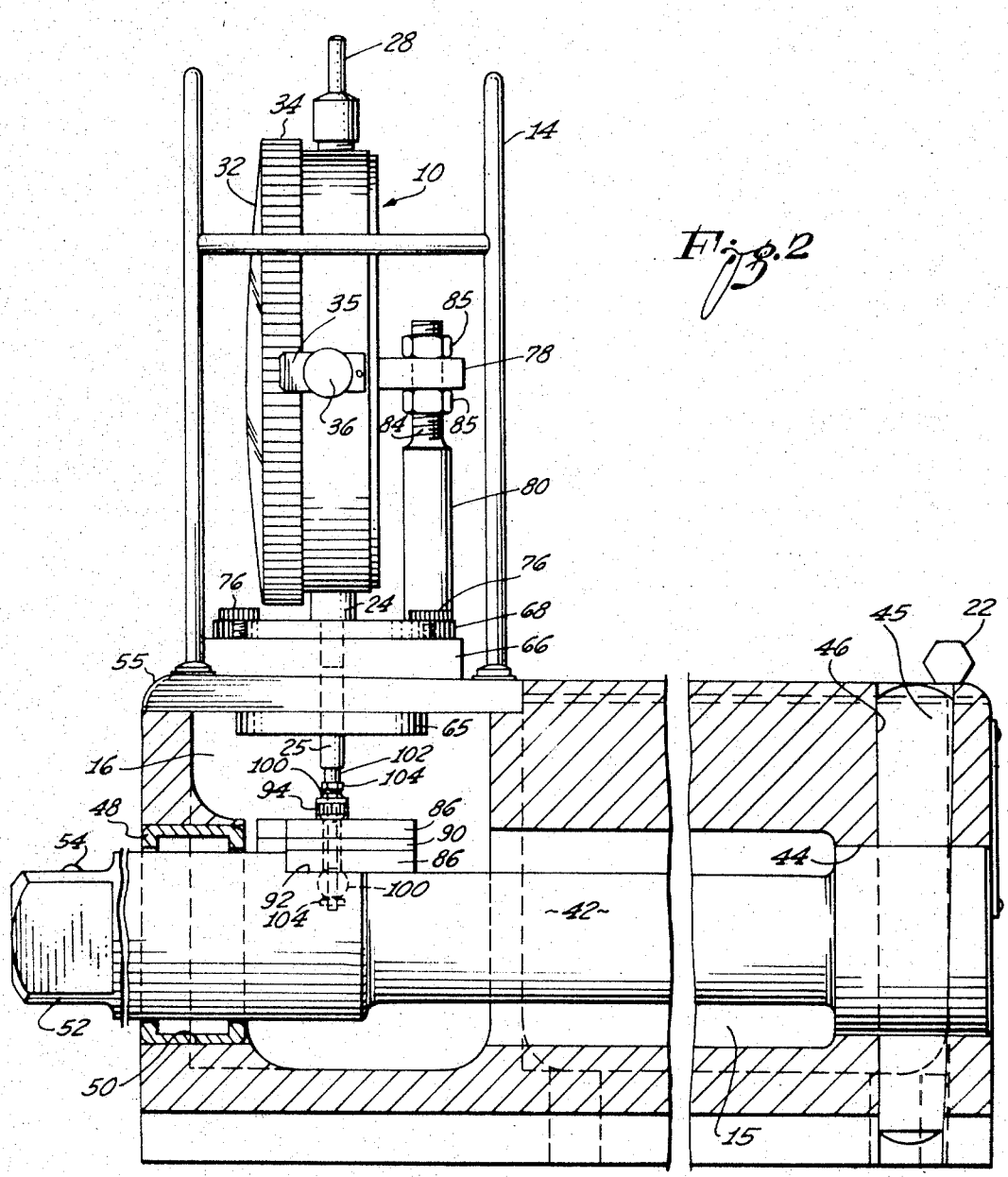
FIG. 2 is a longitudinal section taken as indicated by the line 2—2 of FIG. 1.
Figure 3:
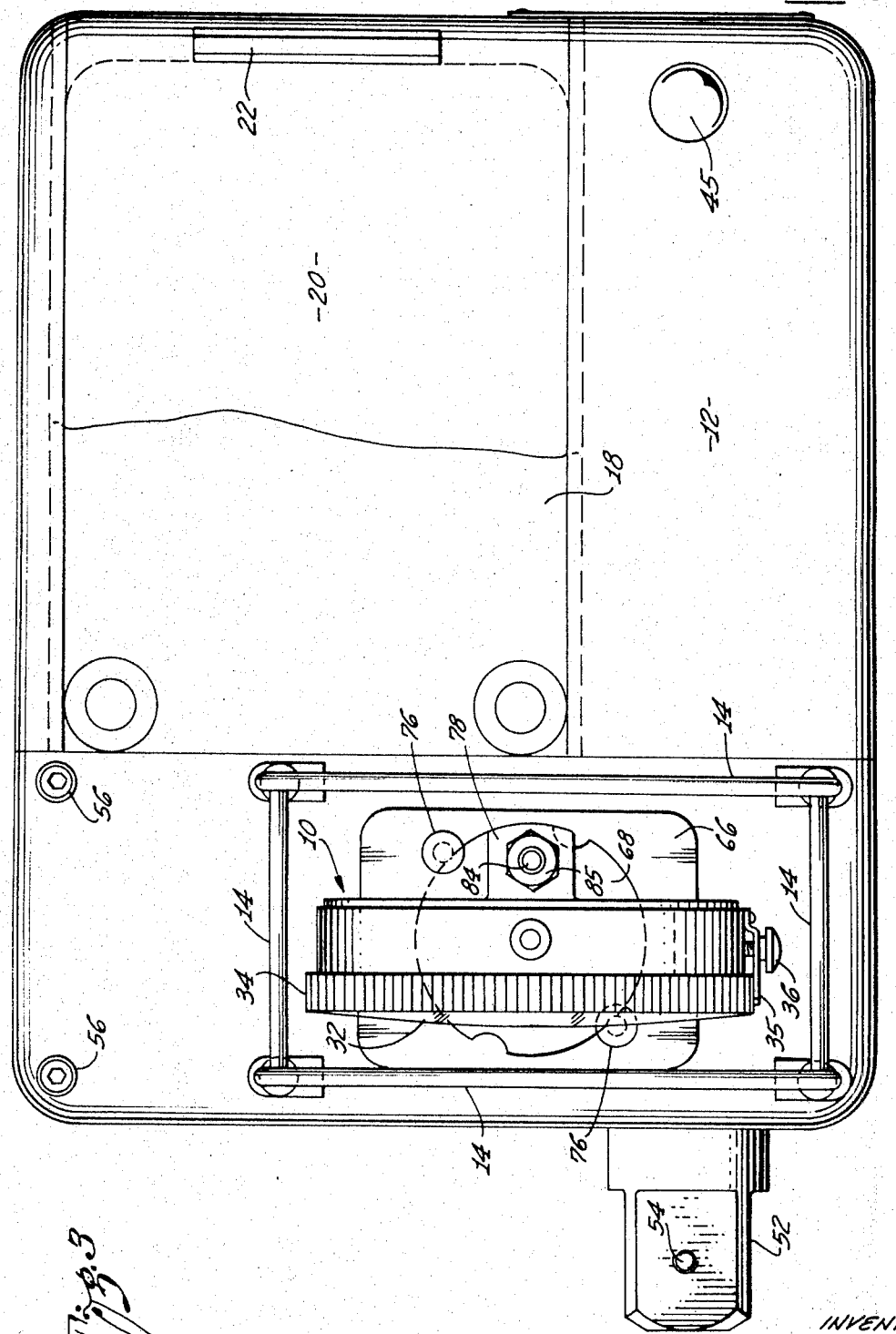
FIG. 3 is a plan view of the torque meter.

For the purpose of the present invention the sensing member 25 of the gage 10 cooperates with a lateral extending arm, generally designated 40, of a torque bar 42. As shown in FIG. 2 the torque bar 42 is mounted in the longitudinal passage 15 with the rear end of the torque bar anchored in a rear bore 44 of the housing 12. A tapered pin 45 in a tapered bore 46 extends through the rear end of the torque bar 42 diametrically thereof to anchor the torque bar against rotation in the bore 44. The torque bar 42 extends forward through a suitable bearing sleeve 48 in a forward bore 50 of the housing with the forward end 52 of the torque rod protruding from the housing. In a well known manner the forward end 52 of the torque bar is of square configuration for engagement by a torque wrench by means of an adapter and has a spring-pressed detent ball for releasable engagement with the wrench.

The gage 10 may be mounted on the housing 12 in any suitable manner and may be adapted in any suitable manner for cooperation with the lateral arm 40 of the torque bar 42. In the preferred practices of the invention it is contemplated that the gage 10 will be adjustable vertically relative to the arm 40 and will also be movable laterally for adjustment along the length of the arm.

The arm 40 extends into the previously mentioned well 16 and the well is normally closed by a cover plate 55 secured by two screws 56 and two screws 57. The cover plate is formed with a relatively large elongated opening or slot 59, the longitudinal axis of which is in alignment with the longitudinal axis of the arm 40. The previously mentioned guard 14 is mounted on the cover plate 55 by the two screws 57 and two additional screws 58.

The gage 10 is adjustably mounted on an adapter 60 in the form of a tubular member with an upper radial flange 62. The adapter removably extends through a bushing 64 which is mounted in the slot 59 and is adjustable along the length of the slot. The bushing 64 has a radial flange 65 to abut the under surface of the cover plate 55 and extends through what may be termed a base plate 66 that is slidable on the upper surface of the cover plate. In the construction shown, the bushing 64 threads into a ring-shaped nut 68 which seats in an annular recess 70 in the base plate 66. The ring-shaped nut 68 is provided with diametrically opposite apertures 72 for engagement by a suitable spanner. To limit the rotation of the bushing 64 when the ring-shaped nut is rotated, the flange 65 of the bushing may be provided with an upwardly extending stud or pin 74 for abutment against the edge of the slot 59.

The adapter 60 is supported on the upper surface of the base plate 66 by means of its radial flange 62 and the radial flange 62 is formed with a pair of diametrically opposite notches 75 which are dimensioned to clear the heads of corresponding thumb screws 76 that are threaded into the base plate 66. The adapter 60 may be rotated to bring the notches 75 into register with the thumb screws 76 for mounting or dismounting the gage and the thumb screws may be tightened to releasably anchor the adapter to the base plate.

As best shown in FIG. 2, the gage 10 is provided with a rigid rearwardly extending ear 78 which is apertured to receive an upstanding post 80. The post 80 is rigidly mounted on the radial flange 62 by means of a screw 82. The upper portion of the post 80 is formed with a screw thread 84 to receive a pair of nuts 85 which cooperate to clamp the ear 78 of the gage.

It is apparent that the gage 10 may be adjusted vertically by loosening the two nuts 85 on the post 80. It is further apparent that the ring-shaped nut 68 may be loosened to permit the base plate 66 together with the bushing 64 to be adjusted along the length of the slot 59 for adjustment of the gage lengthwise of the arm 40.

As heretofore stated, it is contemplated that the sensing member 25 will have what may be termed a floating connection with the arm 40, i.e. a connection which shifts lengthwise of the arm in accord with adjustment of the gage 10 lengthwise of the arm. To carry out this concept, the arm 40 may be an assembly of parts shown in perspective in FIG. 6.

The arm 40 includes two longitudinal plates 86, each of which is formed with a relatively wide forward slot 88, the two slots coinciding. The two longitudinal plates 86 are spaced apart in parallel relation by a short spacer plate 90, the two longitudinal plates and the spacer plate being clamped together and anchored to a flat surface 92

Figure 4:
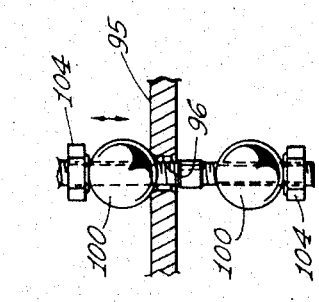
FIG. 4 is an enlarged fragmentary section along the line 4—4 of FIG. 1 showing how the sensing member of the dial indicator is provided with two spaced shoulders for selective abutment against the lateral arm of the torque bar.

(FIG. 1) of the torque bar 42 by suitable screws 94. What may be termed a floating plate 95 with a central aperture 96 is interposed between the two longitudinal plates 86 of the arm and is appreciably thinner than the spacer plate 90 to permit free sliding movement of the floating plate between the two arms. As best shown in FIG. 4, the aperture 96 in the floating plate 95 is chamfered or tapered on its opposite sides to seat selectively shoulders formed by two enlargements in the form of two ball elements 100 carried by the sensing member 25.

The two ball members 100 may be mounted on the sensing member 25 in any suitable manner. In the construction shown, one end of a double ended screw 102 (FIG. 6) threads into the lower end of the sensing member 25. The two ball elements are diametrically bored and tapered to thread onto the double ended screw 102 and are adjustably locked in position by corresponding lock nuts 104.

It is contemplated that the gage 10 will be of the memory type in which the pointer 36 is releasably retained at whatever position it may be advanced by an applied force. For this purpose, a friction member 105 in the form of a piece of Teflon may be mounted on a small bracket 106 which, in turn, is mounted on a backplate 107 of the gage by a screw 108 and cooperating nut 110. The friction member 105 lightly engages the mechanism inside the gage to yieldingly restrain the mechanism against motion.

The manner in which the invention functions for its purpose may be readily understood from the foregoing description. The torque bar 42 is constructed and selected to measure a given range of torque values, the maximum twisting of the torque in the range being under 10° and being preferably on the order of five or six degrees. In preparation for measuring a torque applied clockwise to the torque bar 42 as the torque bar is viewed in FIG. 1, the plunger 28 at the top of the gage is depressed until the uppermost of the two ball elements 100 seats in the upper side of the aperture 96 of the floating plate 95. By virtue of the tapered seat provided by the chamfered aperture 96, the ball automatically centers the floating plate. If the pointer 36 does not register with the zero point on the dial 32, the thumb screw 35 is loosened to permit manual rotation of the scale for the desired null adjustment.

If the torque that is to be measured is to be applied by a torque-release wrench, the wrench is applied to the square end 52 of the torque bar by means of an adapter. The clockwise swing of the arm 40 by the applied torque acts against the upper ball element 100 to displace the sensing member 25 upward and during this swinging movement the floating plate 95 slides slightly to maintain alignment with the axis of the sensing member. When the torque wrench suddenly releases to permit the torque bar 42 to return to normal, the arm 40 reacts by swinging towards the lower ball element 100. The two ball elements 100 are spaced apart by a sufficient distance, however, to keep the reacting arm from striking the lower ball element. By virtue of this arrangement, the reaction of the arm 40 to abrupt termination of a torque force is not transmitted to the sensing member 25. Since the friction member 105 retains the pointer 30 at whatever position it may be advanced, the magnitude of the torque may then be read from the dial 32.

To measure an opposite torque in the counterclockwise direction as the device is viewed in FIG. 1, the opposite procedure is followed. First the upper plunger 28 is pulled upward to bring the lower ball 100 into contact with the floating plate 95 with resultant centering action on the floating plate. If necessary, the dial 32 is then adjusted to make the gage read zero. The application of a counterclockwise torque to the torque bar 42 by a torque-release wrench swings the arm 40 downward against the lower ball element 100 to pull the sensing member 25 downward. When the torque wrench releases, the abrupt termination of the applied torque permits the arm 40 to swing quickly back to its normal position without striking the upper ball element 100. After the torque wrench releases, the magnitude of the torque continues to be indicated by the pointer 30.

Calibration of the device at the time of factory assembly or at any later time is a relatively simple procedure. The gage is raised or lowered on the upright post 84 for vertical adjustment of the gage as required to make possible a zero reading when the upper of the two ball elements 100 is seated against the floating plate 95. For the particular torsional behavior of any randomly selected torque bar 42, there is some particular point along the length of the arm 20 at which the gage 10 will accurately measure all of the torque values within the desired range of angular displacement of the arm. It is a simple matter, therefore, to loosen the circular nut 68 and shift the gage 10 lengthwise of the arm until the correct point is found by trial and error. It is this ready adaptability of the measuring mechanism to the torque response of any particular torque bar that eliminates the wastage involved in discarding torque bars that do not precisely comply with a desired norm.

Figure 5:
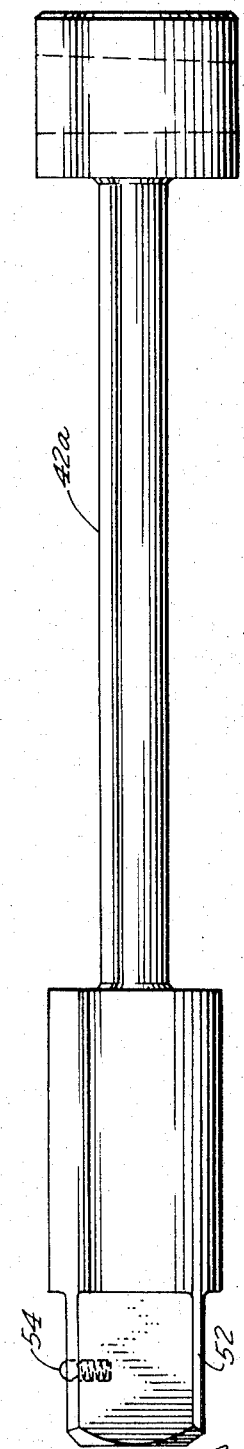
FIG. 5 is a side elevational view of a torque bar that may be substituted for measuring a different range of torque values.

FIG. 5 shows a torque bar 42a that is lighter than the torque bar 42 and may be substituted for the torque bar 42 when a lower range of torque values is to be measured. It is a simple matter to substitute one torque bar for another.

I claim:

1. In a device to measure torque forces, the combination of:

a torque bar fixedly anchored at one end and adapted to receive torque forces at a point spaced longitudinally from the fixed end;

an arm fixedly extending laterally from the bar at a point spaced longitudinally from the fixed end of the bar and associated with the bar to swing about the axis of the bar in each of two opposite directions in response to application of a torsional force to the bar in each of the two opposite directions;

means displaceable by said arm along a chord of an arc described by a point on the arm;

means associated with the displaceable means at spaced positions along the chord of the arm for providing a lost motion of the displaceable means relative to the arm upon a reversal of the direction in which the torque force is applied to the bar; and means to measure the magnitude of displacement of the displaceable means along the chord of the arc.

2. A combination as set forth in claim 1 in which the device measures torque forces within a range of magnitudes below a given maximum magnitude and the torsional response of the bar to the given maximum magnitude is not substantially greater than 10°.

3. A combination as set forth in claim 2 in which the torsional response of the bar to said maximum magnitude is not greater than on the order of 6°.

4. A combination as set forth in claim 1 in which said displacement means is adjustable along the length of the arm to vary the magnitude of its displacement in response to a given angular movement of the arm to permit calibration of the device.

5. A combination as set forth in claim 4 in which said displacement means and the means to measure the displacement are movable in the direction of said chord for calibration of the device.

6. A combination as set forth in claim 1 in which said bar is movably mounted at its fixed end to permit one bar to be substituted for another bar to substitute one range of measurements of torque magnitudes for another range.

7. A combination as set forth in claim 1 in which said measuring means is an indicating gage mechanism.

8. A combination as set forth in claim 1 in which said measuring means and said displacement means are respectively an indicating gage and a sensing member of the indicating gage.

9. A combination as set forth in claim 8 which includes means to adjust the position of the indicating gage relative to the arm for the purpose of calibration.

10. A combination as set forth in claim 8 in which the sensing member is yieldingly restrained to maintain any position to which it may be moved, and
in which the indicating gage has a null adjustment whereby the sensing member may be shifted into operating relation with the arm at the normal unloaded state of the bar and then the indicating gage may be adjusted to read zero torque in preparation for measuring a torsional force.

11. A combination as set forth in claim 8 in which the indicating mechanism of the gage is responsive to opposite movements of the sensing member, and
in which the sensing member is responsive to opposite movements of the arm to permit the device to measure opposite torsional forces.

12. A combination as set forth in claim 11 in which the sensing member has a lost motion connection with the arm and in which the magnitude of the lost motion is greater than the magnitude of movement of the arm in reaction to abrupt termination of a maximum torsional force thereby to avoid damage to the indicating gage by such reaction.

13. In a device to measure torque forces, the combination of:
a torque bar fixedly anchored at one end and adapted to receive torque forces at a point spaced longitudinally from the fixed end;
an arm fixedly extending laterally from the bar at a point spaced longitudinally from the fixed end of the bar to swing about the axis of the bar in response to application of a torsional force to the bar;
means displaceable by said arm along a chord of an arc described by a point on the arm; and
means to measure the magnitude of displacement of the displaceable means,
said measuring means and said displacement means being respectively an indicating gage and a sensing member of the indicating gage,
the indicating mechanism of the gage being responsive to opposite movements of the sensing member,
the sensing member being responsive to opposite movements of the arm to permit the device to measure opposite torsional forces,
the sensing member having a lost motion connection with the arm and the magnitude of the lost motion being greater than the magnitude of movement of the arm in reaction to abrupt termination of a maximum torsional force thereby to avoid damage to the indicating gage by such reaction,
the sensing member having spaced shoulders to abut the arm selectively, said shoulders being spaced apart to provide the desired lost motion.

14. A combination as set forth in claim 13 in which the sensing member extends through an aperture in the arm and said shoulders are provided by enlargements of the sensing member on opposite sides of the aperture to seat selectively against the arm.

15. A combination as set forth in claim 14 in which said aperture is in a floating member that is captive on the arm and is movable along the arm for self-alignment of the aperture with the sensing member.

16. A combination as set forth in claim 15 in which the indicating gage is adjustable in a direction longitudinally of the arm with the floating member responsive to such adjustment to maintain alignment of said aperture with the sensing member of the indicating gage.

17. A combination as set forth in claim 16 in which said floating member is slidable in a guideway between two spaced surfaces of the arm that are parallel to the longitudinal axis of the arm, said guideway providing clearance for the sensing member.

18. In a device to measure a torsional force, the combination of:
a bar fixedly anchored at one end and adapted to receive torsional forces at a point spaced longitudinally from the fixed end;
an arm fixedly extending laterally from the bar at a point spaced longitudinally from the fixed end of the bar and associated with the bar to swing about the axis of the bar in each of two opposite directions in response to the application of torsional forces to the bar in each of the two opposite directions;
a dial with a scale thereon;
a movable sensing member;
an indicating mechanism operatively connected to the sensing member;
a pointer actuated by the indicating mechanism to traverse the scale;
means to yieldingly maintain the sensing member and pointer at whatever positions they may be placed;
said sensing member being at least approximately perpendicular to the perpendicular to the normal unloaded position of the arm and being adjustable longitudinally into operating engagement with the arm and being displaceable along a chord of an arc described by a point on the arm; and
means associated with the sensing member and the arm at spaced positions between the sensing member for providing a lost motion between the sensing member and the arm in response to a reversal of the torsional force applied to the arm.

19. The device set forth in claim 18 wherein the magnitude of the lost motion provided by the lost motion means is greater than the magnitude of the movement in reaction to abrupt termination of a maximum torsional force thereby to avoid damage to the indicating mechanism.

20. In a device to measure a torsional force, the combination of:
a bar fixedly anchored at one end and adapted to receive torsional forces at a point spaced longitudinally from the fixed end;
an arm fixedly extending laterally from the bar at a point spaced longitudinally from the fixed end of the bar to swing about the axis of the bar in response to the application of torsional forces to the bar;
a rotatably adjustable dial with a scale thereon;
a movable sensing member;
an indicating mechanism operatively connected to the sensing member;
a pointer actuated by the indicating mechanism to traverse the scale; and
means to yieldingly maintain the sensing member and pointer at whatever positions they may be placed,
said sensing member being at least approximately perpendicular to the normal unloaded position of the arm and being adjustable longitudinally into operating engagement with the arm and being displaceable along a chord of an arc described by a point on the arm,
whereby in preparation for measurement of a torsional force, the sensing member may be first shifted into operating engagement with the arm and then the dial may be rotated for null adjustment relative to the pointer,
said dial having two oppositely numbered scale values,
said sensing member having two spaced shoulders on opposite sides respectively of the arm for selective operative engagement with the arm,
whereby a measurement of a torsional force in either of two opposite rotary directions may be made by first shifting the sensing member longitudinally to place the appropriate enlargement thereof in operating engagement with the arm, by then rotating the dial as may be necessary for null adjustment relative to the pointer and then applying the torsional force to the bar.

21. A combination as set forth in claim 20 in which the sensing member extends through an aperture in the arm and the spaced shoulders are formed by spaced enlargements on the sensing member.

22. A combination as set forth in claim 20 in which said shoulders are spaced apart to provide a range of lost motion of a magnitude greater than the magnitude of swinging movement of the arm in reaction to abrupt termination of a torsional force to avoid damage to the indicating gage by such reaction.

23. A combination as set forth in claim 22 in which said dial is rotatable about the axis of the sensing member for observation of the dial from any desired position.

References Cited

UNITED STATES PATENTS 3,217,533   11/1965   Able.

FOREIGN PATENTS 858,045   5/1940   France.

S. CLEMENT SWISHER, *Primary Examiner.*

U.S. Cl. X.R.

73—134